United States Patent
Runia

(12) 
(10) Patent No.: US 10,654,498 B2
(45) Date of Patent: May 19, 2020

(54) ZIPLINE TROLLEY WITH A ROLLER BRAKE SYSTEM

(71) Applicant: Calvin Ray Runia, Newberg, OR (US)

(72) Inventor: Calvin Ray Runia, Newberg, OR (US)

(*) Notice: Subject to any disclaimer, the term of this patent is extended or adjusted under 35 U.S.C. 154(b) by 242 days.

(21) Appl. No.: 15/986,454

(22) Filed: May 22, 2018

(65) Prior Publication Data

US 2019/0359234 A1    Nov. 28, 2019

(51) Int. Cl.
| | |
|---|---|
| *B61H 9/02* | (2006.01) |
| *B61B 7/00* | (2006.01) |
| *F16D 63/00* | (2006.01) |
| *A63G 21/20* | (2006.01) |
| *A63G 21/22* | (2006.01) |
| *F16D 125/68* | (2012.01) |
| *F16D 121/14* | (2012.01) |
| *F16D 125/64* | (2012.01) |

(52) U.S. Cl.
CPC ............ *B61H 9/02* (2013.01); *A63G 21/20* (2013.01); *A63G 21/22* (2013.01); *B61B 7/00* (2013.01); *F16D 63/008* (2013.01); *F16D 2121/14* (2013.01); *F16D 2125/64* (2013.01); *F16D 2125/68* (2013.01)

(58) Field of Classification Search
CPC .......... B61H 9/02; A63G 21/20; A63G 21/22; B61B 7/00; F16D 63/008; F16D 2121/14; F16D 2125/64; F16D 2125/68
USPC .......................................... 104/113, 115, 112
See application file for complete search history.

(56) References Cited

U.S. PATENT DOCUMENTS

| | | | | |
|---|---|---|---|---|
| 5,685,227 | A | * | 11/1997 | Gaccetta ................ B61B 3/00 104/250 |
| 5,860,492 | A | * | 1/1999 | Talaska .............. A63C 17/1436 188/5 |
| 7,404,360 | B2 | | 7/2008 | Cylvick |
| 7,966,941 | B1 | | 6/2011 | Brannan |
| 8,985,027 | B2 | | 3/2015 | Brown |
| 9,004,235 | B2 | | 4/2015 | Headings |
| 9,021,962 | B2 | | 5/2015 | Hackett |
| 9,381,926 | B2 | | 7/2016 | Brannan |
| 9,499,181 | B2 | | 11/2016 | Halliday et al. |
| 9,884,633 | B2 | | 2/2018 | Horihan |
| 2010/0300322 | A1 | * | 12/2010 | Cylvick ................ A63G 21/20 104/112 |
| 2011/0162917 | A1 | * | 7/2011 | Steele ................... A63G 21/22 188/65.2 |
| 2015/0232105 | A1 | * | 8/2015 | Perry .................... B61B 12/028 105/149.1 |
| 2015/0303663 | A1 | * | 10/2015 | Wall ........................ H02G 1/02 182/36 |
| 2018/0216656 | A1 | * | 8/2018 | Bailey .................... B60C 27/10 |
| 2018/0304907 | A1 | * | 10/2018 | Richardson .......... B61B 12/028 |

* cited by examiner

*Primary Examiner* — Justin M Jonaitis
(74) *Attorney, Agent, or Firm* — Mersenne Law

(57) ABSTRACT

A zipline trolley brake system comprising trolley rollers, brake rollers, and an arm for controlling the brake rollers, which are connected by a plurality of connectors. The trolley slows and brakes when the arm causes a squeezing motion on the cable by the joint rolling of the trolley rollers and the brake rollers on the cable. The trolley moves when the arm moves to cause the brake rollers not to touch the cable.

19 Claims, 4 Drawing Sheets

ZIPLINE TROLLEY WITH A ROLLER BRAKE SYSTEM

CROSS-REFERENCE TO RELATED APPLICATIONS

This is an original U.S. patent application.

FIELD OF INVENTION

The invention is in the technical field of zipline trolleys. More specifically, this invention relates to a brake system that allows a zipline rider to control the moving, the speed and the braking of a zipline trolley at any point of a zipline.

BACKGROUND

A zipline is a cable that starts at a higher point and ends at a lower one. The natural decline of the slope, or gravity, allows a rider to travel down the cable with acceleration. Ziplines are used for adventures, tourist attractions, entertainment, and utilitarian purposes. Being able to freely control the travel or descent speed and to stop (in the middle or at the end) is important for a zipline rider, based on the rider's comfort level or for other purposes such as sight viewing or working, depending on the circumstances.

There currently exist various brake systems for zipline trolleys. Many brake systems require brake pads to create the frictional resistance on the zipline cable. However, brake pads wear down very quickly which greatly diminishes their ability to slow down or brake. Therefore, brake pads need to be replaced frequently. Other brake systems that do not involve brake pads require additional support setups in the zipline system, which is complex and costly and may not be practical or affordable for some zipline riders.

A simple and economical zipline brake system is desirable. It is also desirable to have a trolley with a brake system that is portable so that a rider can easily transport the trolley to use it with another zipline cable without the need for additional set up. This invention provides a solution to meet these needs.

SUMMARY

The present invention is a zipline brake system that allows a rider to freely control the moving and braking and the speed of a zipline trolley at any point of a zipline cable. Embodiments of the invention comprise a plurality of trolley rollers, a plurality of brake rollers controlled by an arm, all of which are connected by a plurality of connecting members. The rider holds and moves the arm, which causes the brake rollers to either move away from the zipline cable or roll on the zipline cable. When the brake rollers are moved away so they do not touch the zipline cable, the trolley moves with the trolley rollers rolling on the zipline cable by gravitational force. When the brake rollers roll on the zipline cable, depending on the amount of force the rider places on the arm, the joint rolling of the brake rollers and the trolley rollers creates a squeezing motion onto the zipline cable at different sides of the cable, slightly warping the cable and causing either a slowdown of the trolley or braking of the trolley.

Unlike brake pads used by existing art which solely depends on frictional resistance to achieve braking, the joint rolling of brake rollers with trolley rollers creates a squeezing motion onto the zipline cable, which causes slight warping of the zipline cable that prevents the trolley rollers from rolling further, causing the trolley to slow down or stop.

The trolley with a roller brake system is portable and can be used on most any zipline cable without additional set up.

DETAILED DESCRIPTION

Figure 1:
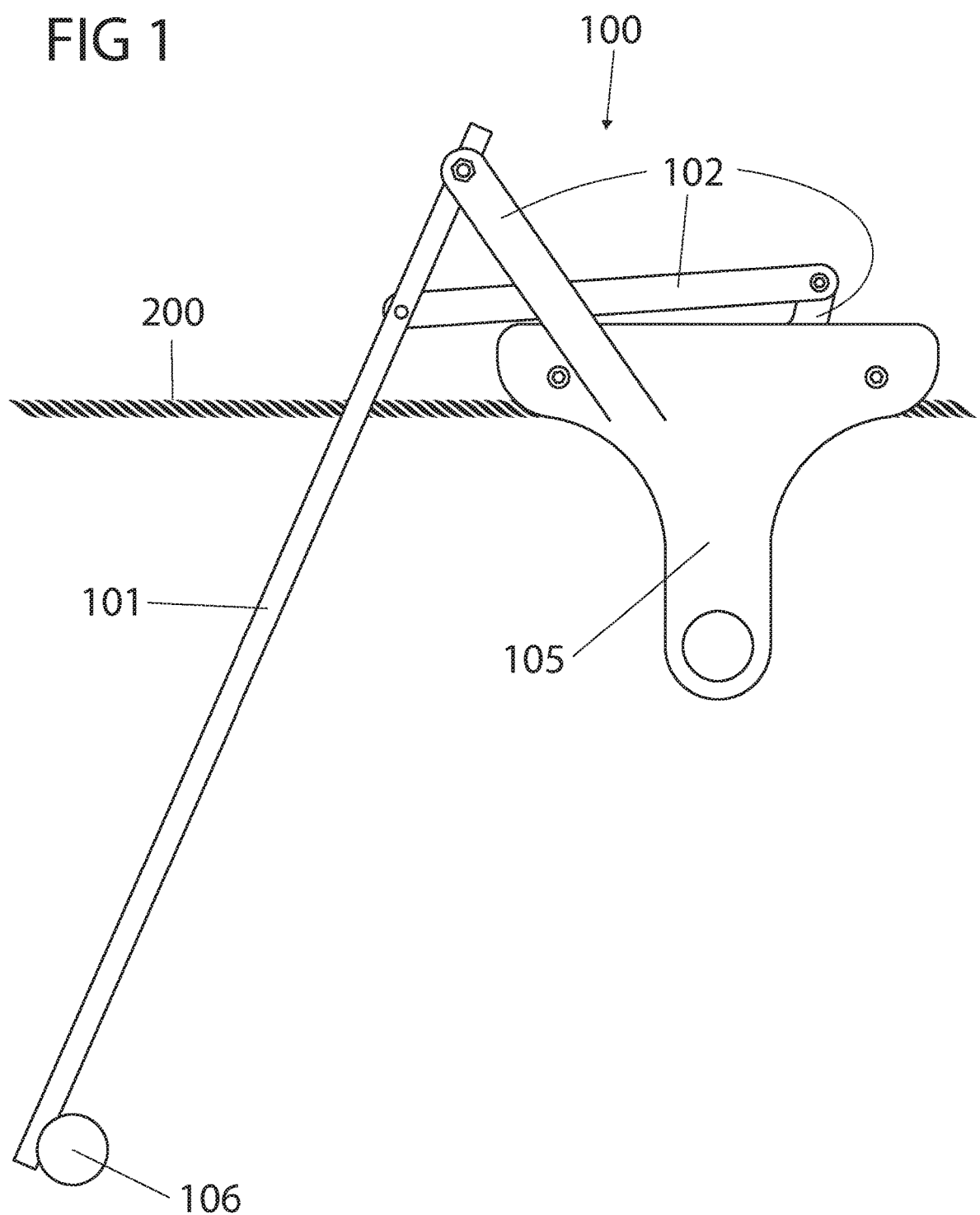
FIG. 1 is side view of an embodiment of the trolley system with a roller brake system on a zipline cable without a rider.

This invention provides a zipline trolley 100 with a roller brake system. While traveling down on a zipline cable 200, to slow down or brake the trolley, the rider will move the arm 101 to cause the brake rollers 103 to be engaged to roll on the zipline cable 200 with the trolley rollers 104, creating a squeezing motion that slightly warps the zipline cable 200.

FIG. 1 is an embodiment of the trolley 100. A plurality of connectors 102 connect the brake rollers 103 (shown in FIGS. 2A-2B), the trolley rollers 104 (shown in FIGS. 2A-2B), the arm 101 and a set of seat connectors 105 for installing seating for the rider. In FIG. 1, the brake rollers 103 and the trolley rollers 104 are hidden by sight behind the set of seat connectors 105. Through the plurality of connectors 102, the arm 101 controls the brake rollers 103 by moving forward and backward.

Figures 3A, 3B:
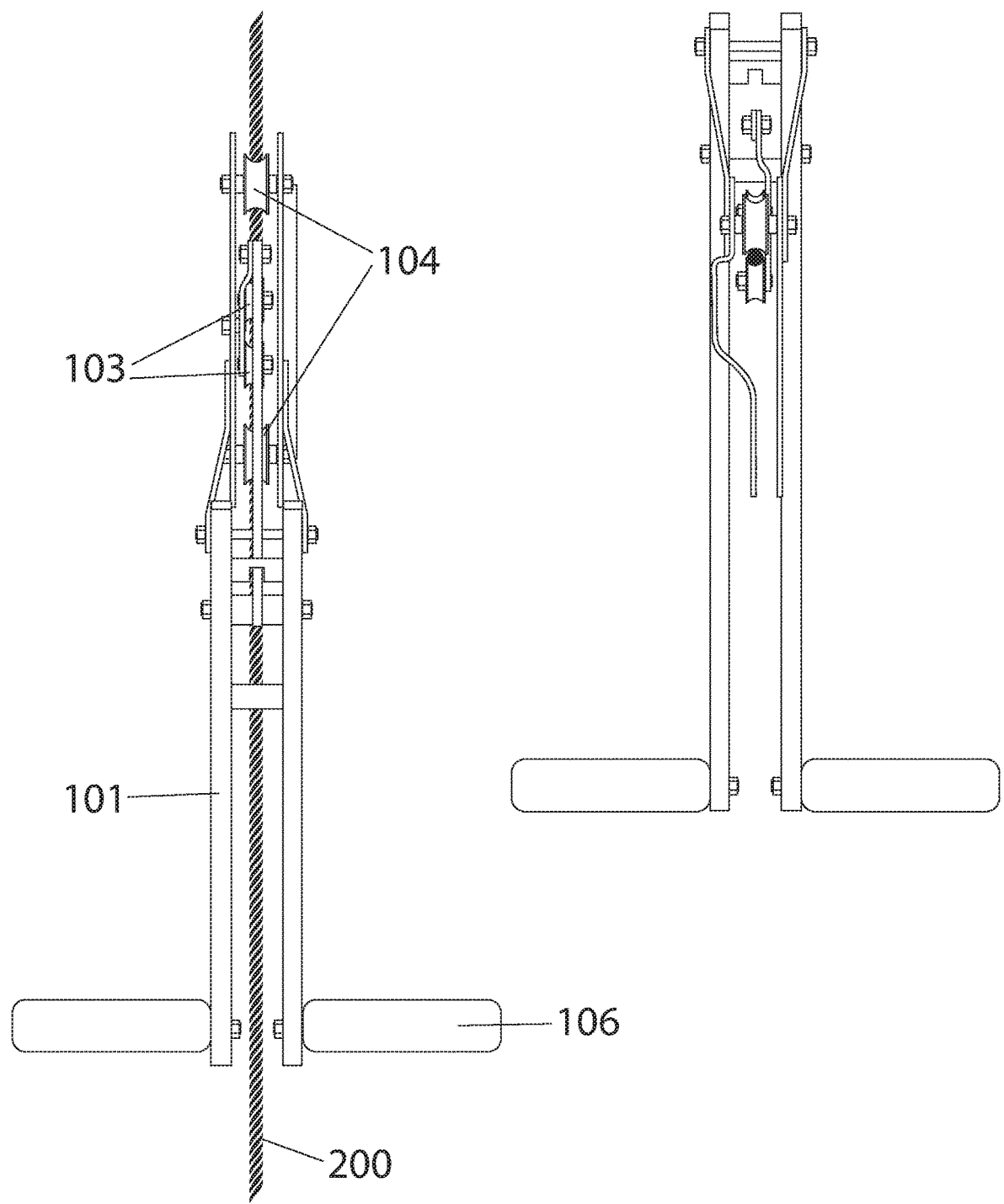
FIG. 3A is a top view of the same embodiment in FIG. 1, with a zipline cable.
FIG. 3B is a front view of the same embodiment in FIG. 1.

The end of the arm may have a set of handles 106 for the rider to grab to control the movement and direction of the arm 101, which in turn controls the brake rollers 103. Alternatively, the rider may grab the arm 101 directly (without the handles 106) to control the brake rollers 103. In the embodiment where the arm 101 has handles 106, the handles 106 may be padded to provide more comfort for the rider. The arm 101 and the handle 106 may be made of one integral piece, or separate pieces coupled together. The length of the arm 101 may be adjusted to suit riders of different heights. The arm may be made to include two connected elongated members and may be one piece having an opening to allow the brake rollers 103 and the trolley milers 104 to pass through when the arm 101 is moved backward as shown in FIG. 3B.

Figure 2A:
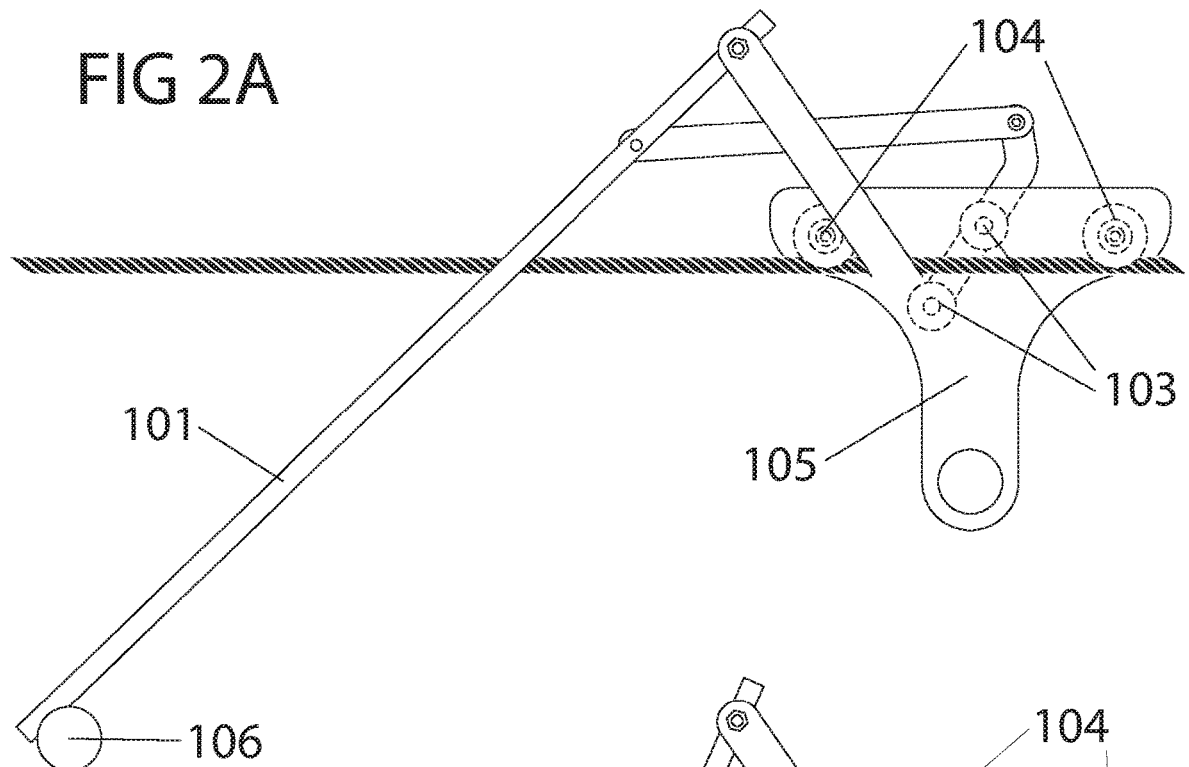
FIG. 2A is a sectional side view of an embodiment of the brake system, showing the brake rollers are disengaged and not touching the zipline cable.

FIG. 2A shows the sectional side view of the brake system of the trolley in FIG. 1, with one seat connector 105 removed. With the brake rollers 103 at a disengaged position and only the trolley rollers 104 rolling on the zipline cable 200, the gravitational force makes the trolley 100 travel down the zipline cable 200. If the brake milers 103 are arranged to form a line, the line at the disengaged position may be perpendicular to the zipline cable 200.

Figure 2B:
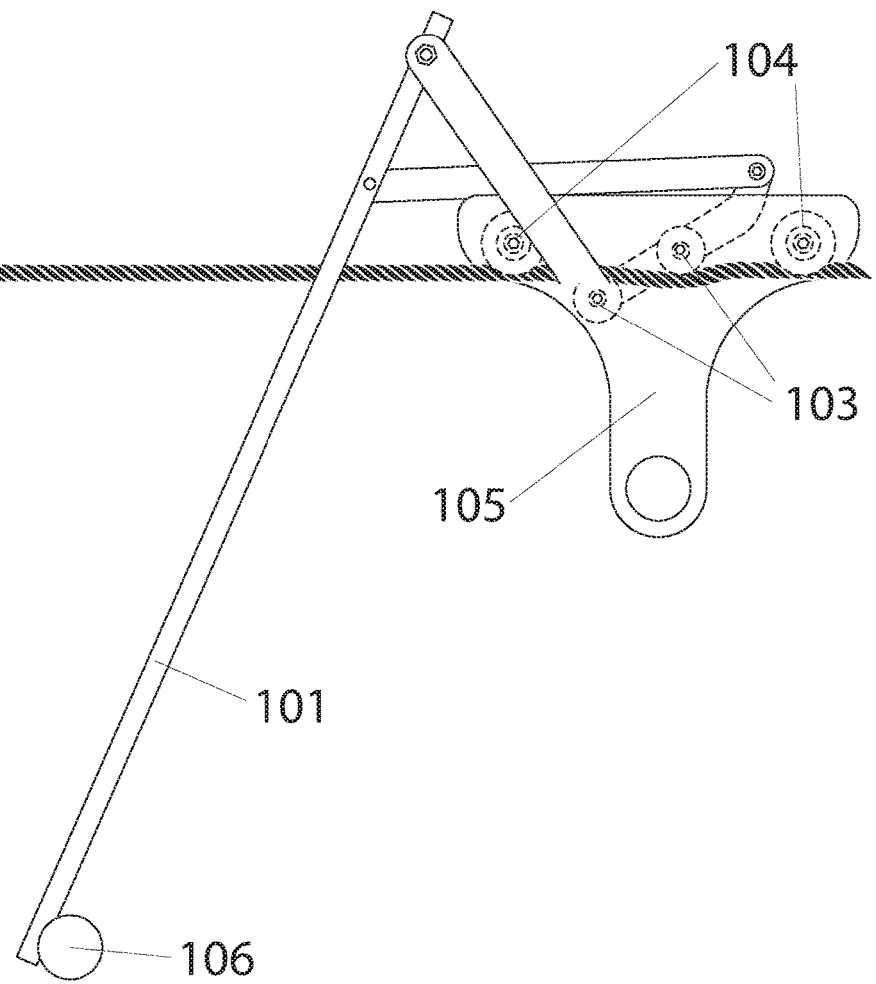
FIG. 2B is the same view of FIG. 2A, but the brake rollers are engaged to roll on the zipline cable.

When the brake rollers 103 are at an engaged position and roll on the zipline cable 200, an embodiment of the brake system is shown in FIG. 2B. The joint rolling motion of the brake rollers 103 with trolley rollers 104 cause the slight warping of the zipline cable 200, which slows down or brakes the trolley 100, depending on the amount of pressure the rider applies onto the arm 101. In this embodiment, the arm 101 is moved backward (towards the rider) to engage the brake rollers 103. In other embodiments, the arm 101 may be moved to a different direction to engage or disengage the brake rollers 103.

The brake rollers 103 and the trolley rollers 104 may have the same size or different sizes. There can be at least two brake rollers and two trolley rollers. Although a trolley having more than two brake milers and/or more than two trolley rollers can be used, a trolley having two brake rollers and two trolley rollers is sufficient and economical.

The trolley with a roller brake system may be made of metal, for example, stainless steel, or some other material that can endure the weight, rolling, and squeezing. Different parts of the trolley may be made of different materials.

Figure 4:
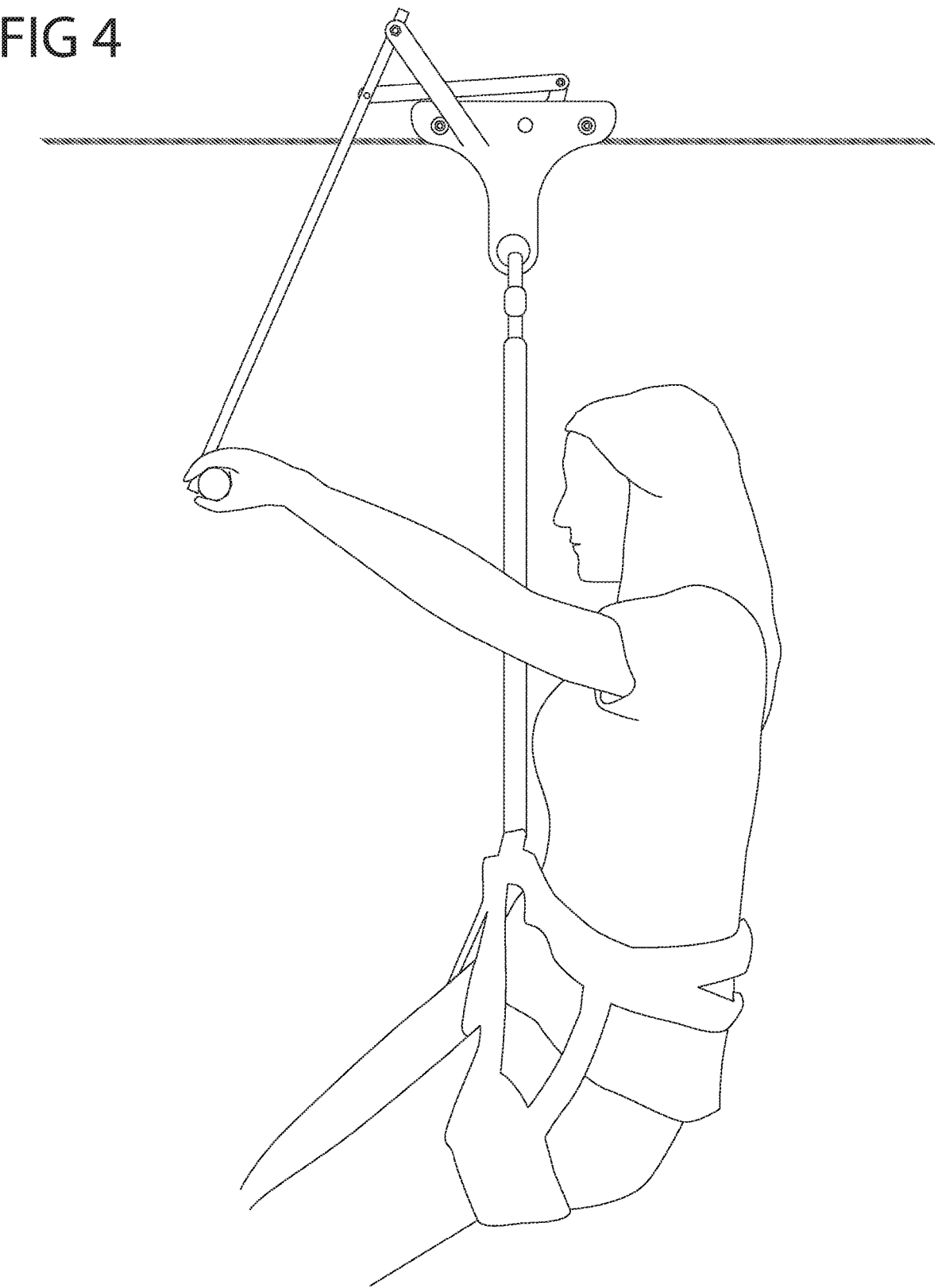
FIG. 4 shows a rider using an embodiment of the trolley system.

To use the trolley on a zipline cable, as shown in FIG. 4, the rider places the trolley on the zipline cable by having the trolley rollers sit and roll on the cable and the rider sits on a seating member that is installed via the seating member. The rider travels down the zipline cable by moving the arm forward to cause the brake rollers disengage. When the rider desires to slow down or stop, the rider moves the arm towards him/herself to cause the brake rollers to engage and roll on the zipline cable. By applying enough force, the trolley will stop. When safe, the rider may step off the seating member and remove the trolley from the zipline cable.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or other items that can be added to the listed items.

Upon studying the disclosure, it will be apparent to those skilled in the art that various modifications and variations can be made in the invention and methods of various embodiments of the invention. Other embodiments will be apparent to those skilled in the art from consideration of the specification and practice of the embodiments disclosed herein. It is intended that the specification be considered as examples only. The various embodiments are not necessarily mutually exclusive, as some embodiments can be combined with one or more other embodiments to form new embodiments.

What is claimed is:

1. A zipline trolley system for a zipline rider comprising:
    a) a trolley comprising
        i) two trolley rollers;
        ii) two brake rollers;
        iii) an arm for controlling the brake rollers such that the brake rollers alternate between a disengaged position and an engaged position;
        iv) a plurality of connecting members for connecting the trolley rollers, the brake rollers, the arm, and a set of seat connectors for installing seating for the rider; and
    b) a zipline cable on which the trolley rollers roll, wherein the cable passes between the two brake rollers, wherein the trolley brakes when the brake rollers are at the engaged position by creating a squeezing motion on the cable with the trolley rollers, and the trolley moves forward when the brake rollers are at the disengaged position.

2. The system of claim 1, wherein the brake rollers are smaller than the trolley rollers.

3. The system of claim 1, wherein a line between the brake rollers at the disengaged position is perpendicular to the cable.

4. The system of claim 1, wherein the brake rollers are at the engaged position when the arm moves towards the rider, and the brake rollers are at the disengaged position when the arm moves away from the rider.

5. The system of claim 1, wherein the system is made of stainless steel.

6. The system of claim 1, wherein a length of the arm can be adjusted to suit riders of different heights the arm.

7. A brake system for a zipline trolley comprising:
    a) an arm;
    b) a set of trolley rollers for rolling the trolley in a moving direction on a zipline cable;
    c) a set of brake rollers through which the zipline cable passes, wherein the set of brake rollers and the set of trolley rollers jointly roll to create a squeezing motion onto the zipline cable to brake the trolley when the arm moves opposite to the moving direction of the trolley; and
    d) a plurality of connectors for coupling the set of trolley rollers, the set of brake rollers, and a set of seating members for installing seating.

8. The system of claim 7, wherein the arm comprises two connected elongated members.

9. The system of claim 7 further comprising a handle.

10. The system of claim 7, wherein the set of trolley rollers of the brake system comprises two trolley rollers.

11. The system of claim 7, wherein the set of brake rollers of the brake system comprises two brake rollers.

12. The system of claim 7, wherein the trolley rollers of the set of trolley rollers and brake rollers of the set of brake rollers have different sizes.

13. A brake system for braking a zipline trolley, comprising:
    a) a plurality of trolley rollers for rolling on a cable;
    b) a plurality of brake rollers controlled by an arm; and
    c) a plurality of connectors for connecting the plurality of trolley rollers and the plurality of brake rollers and for connecting a seating member for a rider; wherein
    the trolley slows and brakes when the rider moves the arm to cause a squeezing motion that slightly warps the cable between the plurality of trolley rollers and the plurality of brake rollers, and the trolley moves when the rider moves the arm to cause the brake rollers not to touch the cable.

14. The system of claim 13, wherein the brake system consists of two trolley rollers.

15. The system of claim 13, wherein a length of the arm can be adjusted to suit riders of different heights the arm.

16. The system of claim 13, wherein the trolley moves forward when the rider moves the arm forward and the trolley brakes when the rider moves the arm backward.

17. The system of claim 13, wherein the arm has adjustable length.

18. The system of claim 13 further comprising two handles at an end of the arm.

19. The system of claim 18, wherein the two handles comprise soft padding.

* * * * *